(12) United States Patent
Bhagavatula et al.

(10) Patent No.: US 11,166,181 B2
(45) Date of Patent: Nov. 2, 2021

(54) METHOD AND SYSTEM FOR PERFORMANCE ESTIMATION OF A COMMUNICATION LINK

(71) Applicant: ASSIA SPE, LLC, Wilmington, DE (US)

(72) Inventors: Ramya Bhagavatula, Mountain View, CA (US); Guocong Song, Cupertino, CA (US); Kenneth J. Kerpez, Long Valley, NJ (US); Wonjong Rhee, San Francisco, CA (US)

(73) Assignee: ASSIA SPE, LLC, Wilmington, DE (US)

( * ) Notice: Subject to any disclaimer, the term of this patent is extended or adjusted under 35 U.S.C. 154(b) by 0 days.

(21) Appl. No.: 16/846,276

(22) Filed: Apr. 11, 2020

(65) Prior Publication Data
US 2020/0245169 A1    Jul. 30, 2020

Related U.S. Application Data

(63) Continuation of application No. 16/516,209, filed on Jul. 18, 2019, now Pat. No. 10,652,773, which is a continuation of application No. 14/414,435, filed as application No. PCT/US2012/046810 on Jul. 13, 2012, now Pat. No. 10,375,590.

(51) Int. Cl.
| | |
|---|---|
| *H04W 24/08* | (2009.01) |
| *H04L 12/26* | (2006.01) |
| *H04M 3/22* | (2006.01) |
| *H04M 11/06* | (2006.01) |
| *H04L 12/24* | (2006.01) |

(52) U.S. Cl.
CPC ............. *H04W 24/08* (2013.01); *H04L 43/10* (2013.01); *H04L 43/12* (2013.01); *H04M 3/2209* (2013.01); *H04M 11/062* (2013.01); *H04L 41/142* (2013.01); *H04L 41/16* (2013.01); *H04L 43/087* (2013.01); *H04L 43/0811* (2013.01); *H04L 43/0847* (2013.01); *H04L 43/0852* (2013.01)

(58) Field of Classification Search
CPC combination set(s) only.
See application file for complete search history.

(56) References Cited

U.S. PATENT DOCUMENTS

| | | | |
|---|---|---|---|
| 8,667,123 B2* | 3/2014 | Orton ...................... | H04L 12/40 709/224 |
| 2008/0205501 A1* | 8/2008 | Cioffi .................. | H04M 3/2209 375/224 |

(Continued)

*Primary Examiner* — Junpeng Chen
(74) *Attorney, Agent, or Firm* — North Weber & Baugh LLP; Michael North

(57) ABSTRACT

Described is a method for performance estimation of a communication device. The method comprises: executing active probing to determine active probing data; reading operational data which includes data related to channel and its noise condition, latency and counter values related to user data traffic between the communication device and another communication device, wherein the operational data is relevant to the current settings of the communication device; and training a performance estimation algorithm for the communication device according to the active probing data and the operational data.

19 Claims, 4 Drawing Sheets

(56) References Cited

U.S. PATENT DOCUMENTS

| | | | | |
|---|---|---|---|---|
| 2009/0325572 A1* | 12/2009 | Ji | ............................ | H04W 24/06 455/424 |
| 2010/0157824 A1* | 6/2010 | Thompson | .............. | H04L 43/50 370/252 |
| 2013/0308471 A1* | 11/2013 | Krzanowski | ........ | H04L 43/0811 370/252 |

* cited by examiner

METHOD AND SYSTEM FOR PERFORMANCE ESTIMATION OF A COMMUNICATION LINK

CROSS-REFERENCE TO RELATED APPLICATIONS

This application is a continuation of previously filed and copending patent application Ser. No. 16/516,209, entitled, "METHOD AND SYSTEM FOR PERFORMANCE ESTIMATION OF A COMMUNICATION LINK," naming as inventors Ramya Bhagavatula, Guocong Song, Kenneth J. Kerpez, and Wonjong Rhee, and filed Jul. 18, 2019, and this application is a continuation of previously filed and copending patent application Ser. No. 14/414,435, entitled, "METHOD AND SYSTEM FOR PERFORMANCE ESTIMATION OF A COMMUNICATION LINK," naming as inventors Ramya Bhagavatula, Guocong Song, Kenneth J. Kerpez, and Wonjong Rhee, and filed Aug. 12, 2015, which is a 371 National Phase of International PCT Patent Application No. PCT/US2012/046810, entitled "METHOD AND SYSTEM FOR PERFORMANCE ESTIMATION OF A COMMUNICATION LINK," naming as inventors Ramya Bhagavatula, Guocong Song, Kenneth J. Kerpez, and Wonjong Rhee, and filed Jul. 13, 2012, which applications are hereby incorporated herein by reference in their entireties.

BACKGROUND

Monitoring performance of a communication link is performed, for instance, for proactively addressing and preventing user complaints, for deciding when to upgrade hardware associated with the communication link, for deciding when to trigger an optimization algorithm, for verifying that the optimization algorithm has improved performance, etc.

Communication system performance can be evaluated using traditional testing software applications such as iperf, netperf, ttcp, etc. Such software applications need to be installed at two communication devices where the application on one device generates and sends test data and the application on the other device receives the test data. After the test is complete, statistics of data transportation are evaluated to evaluate the performance of the communication link between the two devices.

The term "performance" herein refers generally to network throughput (e.g., TCP/UDP), latency, jitter, connectivity, error rates, power consumption, transmit power, etc. Improving performance of the communication system includes increasing throughput, reducing error rate and latency, improving (i.e., reducing) jitter, reducing power consumption, etc. for the communicating system. The term "TCP" stands for transmission control protocol. The term "UDP" refers to user datagram protocol.

However, testing of a communication system or network to gauge its performance via such traditional testing software applications is intrusive to customer network service. These traditional tests impose test traffic on the network which can have a deleterious impact on the customer's traffic.

BRIEF DESCRIPTION OF THE DRAWINGS

Embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Figure 1:
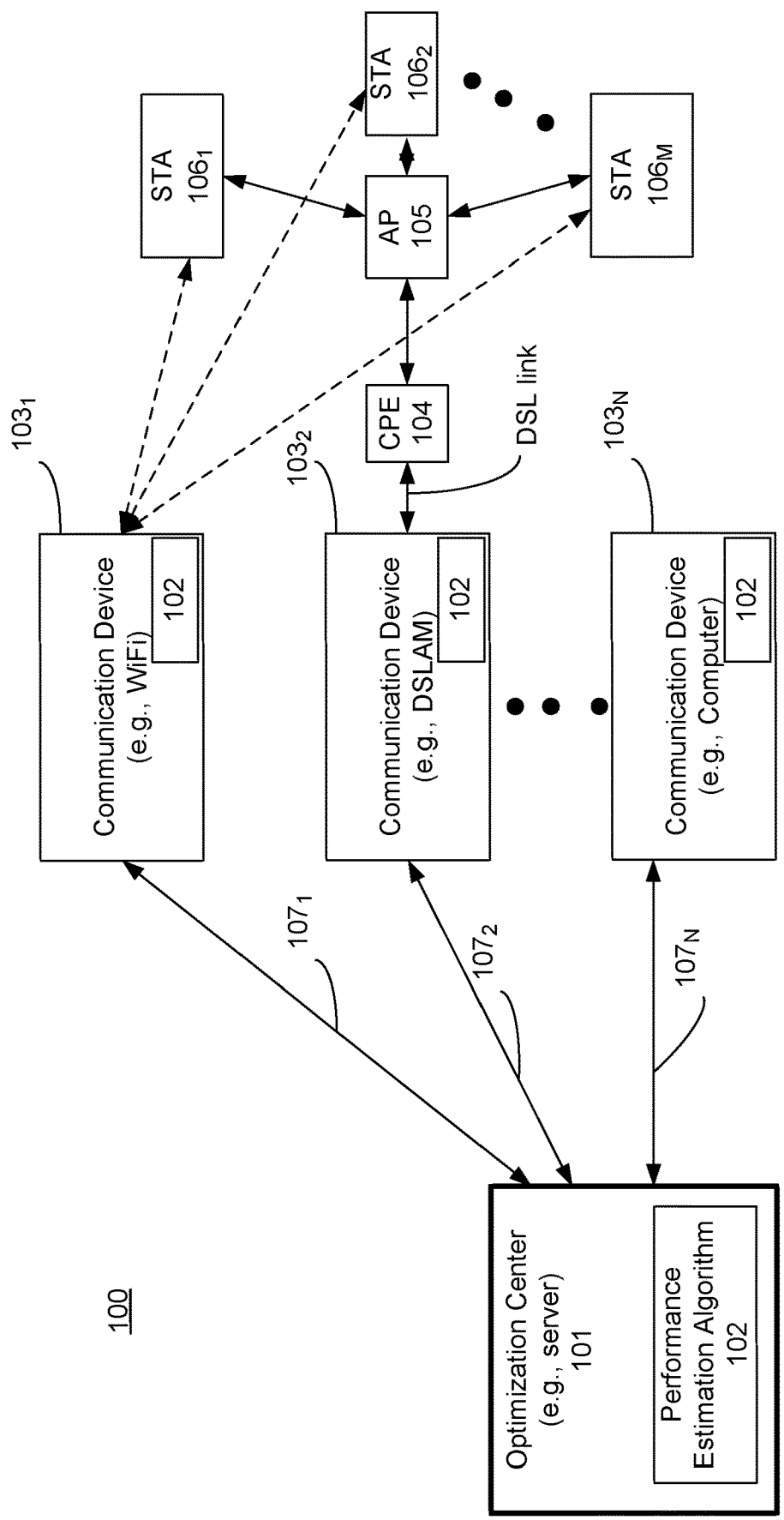
FIG. 1 is a communication network which is operable to estimate and improve communication system performance algorithm, according to one embodiment of the disclosure.

The traditional method to test network traffic, which is intrusive to user network service, is referred to "active probing." The term "active probing" herein generally refers to testing of a communication network by sending test pattern/data over the network from one communication device to another communication device, and then measuring the response from the sent test pattern. The response data is also referred herein as "active data" or "active measurement data" which is data associated with active probing of a communication network.

Traditional active probing software such as iperf, netperf, ttcp, etc, is run at application layers, where a data transmission application software and a data reception application software are used together for accurately measuring performance between the two transmission and reception devices. Traditional active probing is accurate because actual test data is transmitted in the same way as user traffic would be transmitted over the network. Frequent active probing can be annoying to the user because it may delay user traffic. It is possible to run active probing without stopping user traffic, but such a measurement is not accurate because the testing traffic competes with the user traffic, and furthermore active probing can significantly impair the user experience due to lower throughput and/or higher latency. To overcome this and other limitations, method and system for measuring performance without impacting customer's traffic are described herein.

An advanced active probing method is described in Attorney Docket No. P067PCT, (PCT Application No. entitled "Method and System for Performance Measurement of a Communication Link" filed concurrently with this application on Jul. 13, 2012, incorporated by reference herein in its entirety, and co-owned by ASSIA Inc. of Redwood City, Calif., 94065, USA.), can avoid the user traffic issue, by considering operational data that account for the user traffic as well as the test traffic.

Another mechanism to gauge performance of a communication link and/or communication device is to monitor operational data associated with a communication device. The operational data is generated for several purposes. For example, operational data is sometimes generated as a by-product of normal operation of the communication device. In another example, operational data is generated to provide basic performance or operation information associated with the communication device. Reading or collecting of such operational data is not intrusive to user network service. Monitoring or reading of such communication data (operational data) is sometimes referred as "passive probing," herein. Usually, operational data of communication devices do not contain the most important and advanced performance metrics such as throughput or latency, but a rough estimation of advanced metrics can be possible using operational data.

For instance, throughput may be roughly estimated from typical operational data such as packet error counts and PHY-layer constellation information that indicate how many bits are being transmitted per data symbol. Such an estimate, however, might not be accurate because the used operational data might not contain sufficient information about throughput and because the relation between the operational data and throughput is often dependent on noise (including interference) and channel characteristics that quickly change for different locations and different time.

In the embodiments of this disclosure, operational data are used together with active-probing data to get a reliable estimate of performance of a communication link. In one embodiment, while active-probing data is used, the operational data can be collected together. With the complete set of active-probing data and operational data, active-probing data results are considered as an accurate estimation of performance of the communication link and are used for training operational-data-only estimation algorithms.

In one embodiment, once the training is complete and the accuracy of operational-data-only estimation is fully understood, the system is monitored with operational data without frequent active-probing that is service intrusive. In one embodiment, active-probing is invoked infrequently, or even dynamically depending on the need for accurate performance estimation and need for training data for updating operational-data-only estimator.

The embodiments of the disclosure can be used in a few different ways. For example, at a higher level abstraction, active-probing and operational data may be collected from a large (e.g., 100 or more communication devices forming a network) communication network and analysis can be performed over the entire data to develop passive estimators with a good accuracy. In one embodiment, such passive estimations are performed with any well known machine learning techniques such as SVM (Support Vector Machine).

In another example, at a lower level abstraction, passive estimator can be adaptively tuned for each communication link in the communication network. Each environment is unique and the best estimator can be dependent on the environment. In one embodiment, machine learning or any learning is performed for each communication device in the communication system such that the passive estimator provides the best performance for the given environment.

In one embodiment, the performance estimation algorithm performs updates as follows. First, an initial step size is defined. If the throughput estimation using passive data is determined to be too low by the active probing data, then this throughput estimation is increased proportional to the step size. If the throughput estimation using passive data is determined to be too high by the active probing data, then this throughput estimation is decreased proportional to the step size. The terms "low" and "high" refer to programmable or predetermined thresholds distinct from one another. If the throughput estimation is decreased and then increased at the next iteration, or if the throughput estimation is increased and then decreased at the next iteration, then the step size is lowered.

In one embodiment, the operational data are read from counters (also referred herein as operational counters associated with the communication device) that increase in count value for successfully delivered packets. The term "successful" herein refers to an indication suggesting safe receipt of a packet by a communication device that is often confirmed by ACK (acknowledge) message packet. In another embodiment, operational data such as error counts, retransmission counts, modulation, signal strength, etc. are used to estimate the throughput of the communication link.

During the process of passive probing, i.e., reading of operational data, customer network service is not interrupted. Operational data is generally user visible or accessible data and is generally used for debugging and basic performance monitoring of communications systems, but generally not for advanced performance estimation because the data was not designed for the performance monitoring, does not carry sufficient information related to performance and there is no known estimation algorithms with high accuracy. Therefore, passive probing alone may not be enough to determine advanced performance of a communication system and operational data generally includes counter values that are only weakly associated with the current performance of a communication system.

The embodiments herein disclose a method and system for improving performance estimation of a communication device by using operational data together with active probing data to train a performance estimation algorithm. In one embodiment, after training the performance estimation algorithm using both active probing data that is accurate and passive probing data that is not intrusive, operational data is monitored regularly and used to accurately update the performance estimation without interrupting customer traffic over the network.

In one embodiment, active probing is initiated when there is a need to update the performance estimation algorithm. Thereafter, the performance estimation algorithm is trained via passive operational probing data. In another embodiment, active probing is initiated periodically (i.e., at regular intervals) to check if the performance estimation algorithm that uses passive probing data only is estimating performance with comparable accuracy to the active probing data's algorithm. The embodiments herein provide an efficient and nearly non-intrusive method for estimating performance of a communication device, and for managing a network system with little or no interruption to the users of the network.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

In the following description and claims, the term "coupled" and its derivatives may be used. The term "coupled" herein refers to two or more elements which are in direct contact (physically, electrically, magnetically, optically, etc.). The term "coupled" herein may also refer to two or more elements that are not in direct contact with each other, but still cooperate or interact with each other.

As used herein, unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. The term "substantially," "approximately," "nearly," "about," "close," and such similar terms refer to a quantity being within +/−20% of a target value.

FIG. 1 is a communication network 100 which is operable to estimate and improve communication system performance estimation algorithm, according to one embodiment of the disclosure. In one embodiment, the communication network comprises an optimization center 101 (e.g., server) communicatively coupled to one or more communication devices 1031-N, where 'N' is a positive integer. In one embodiment, communication device 1032 is coupled to a Customer Premises Equipment (CPE) modem 104 via a Digital Subscriber Line (DSL) link. In one embodiment, the CPE modem 104 is coupled to an access point (AP) 105. In one embodiment, the AP 105 is coupled to one or more stations (STAs) 1061-M, where 'M' is a positive integer.

In one embodiment, performance estimation algorithm 102 is an equation with input variables being the passive probing data. In one embodiment, performance estimation algorithm 102 either increases or decreases in proportion to passive probing data.

In one embodiment, instructions for updating and/or developing a performance estimation algorithm 102 are stored on the optimization server 101 and/or one or more of the communication devices 1031-N. While the embodiment of FIG. 1 does not show that the other devices 104, 105, and 1061-M include instructions for updating and/or developing a performance estimation algorithm 102, in one embodiment any communication device coupled directly or indirectly to the network (wired or wireless) may have instructions for updating and/or developing a performance estimation algorithm 102. In one embodiment, the performance estimation algorithm 102 can be tuned per each communication device according to the communication device's data and environments. In one embodiment, the resulting performance estimation algorithm 102 can be different over the communication devices 1031-N.

In one embodiment, the communication devices 1031-N include an access point (AP); a base station; a wireless local area network (LAN) device; a Digital subscriber line access multiplexer (DSLAM); a gateway; a performance enhancement device; a Digital Subscriber Line (DSL) CPE (Customer premises equipment) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; an set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In one embodiment, the one or more communication devices 1031-N are operable to execute active probing to determine active probing data. In this embodiment, the one or more communication devices 1031-N flood traffic on their respective communication links 1071-N to the optimization center 101. In this embodiment, response received by the one or more communication devices 1031-N from the optimization center 101 over the communication links 1071-N is the active data, which is used by the respective performance estimation algorithms 102 in the corresponding one or more communication devices 1031-N to train the performance estimation algorithms.

In one embodiment, the one or more communication devices 1031-N are operable to execute active probing by transmitting active probing data from one communication device to another communication device. For example, communication device 1031 transmits active probing data to communication device 1061 and/or communication device 1032 transmits active probing data to CPE 104 over a DSL link. In another example, communication device 1061 transmits active probing data to optimization center 101 via communication links including 1071.

In one embodiment, the one or more communication devices 1031-N are further operable to wait for a predetermined time before reading the operational data including counter values related to user data traffic on the communication links 1071-N. In one embodiment, the predetermined time is in the range of 0.001 seconds to 60 seconds. In other embodiments other waiting periods may be used. In one embodiment, the waiting period is programmable by software or hardware.

So as not to obscure the embodiments of the disclosure, communication devices 1031, 1032, 104, and optimization center 101 are discussed. The same discussion is applicable to other communication devices. In one embodiment, the communication device 1031 is further operable to receive a report indicating amount of data or data received by the other communication device (e.g., optimization center 101, and/or communication device 1032).

In one embodiment, the one or more communication devices 1031-N are operable to read operational data which includes data related to channel (e.g., links 1071-N, links between 105 and 1061-M, links between 1031 and 1061-M, and/or DSL links between 1032 and 104) and its noise condition, data relevant to the current setting of the communication devices 1031-N, and counter values related to user data traffic between the communication devices 1031-N and another communication device (e.g., optimization center 101, 105, 1061-M, 104, etc), wherein the operational data is relevant to the current settings of the communication device. Examples of such operational data are successful transmit packet counts, successful receive packet counts, ACK packet counts, error packet counts, discarded packet counts, retransmission counts, etc.

In one embodiment, the one or more communication devices are operable to execute active probing fewer times than to execute passive probing. For example, active probing is executed at most 5 times per day because it is an intrusive process, and passive probing is executed 1440 times per day (e.g., every one minute).

In one embodiment, the one or more communication devices 1031-N are operable to train their respective performance estimation algorithms 102 according to the active probing data and the operational data. In one embodiment, the one or more communication devices 1031-N are operable to, prior to executing active probing, read operational data (i.e., passive probing) from counter values related to the user data traffic on communication links. For example, links 1071-N, links between 105 and 1061-M, links between 1031 and 1061-M, and/or DSL links between 1032 and 104.

In one embodiment, the counter values include at least one of packet error counts, packet retransmission counts, successful ACK message counts, etc. In one embodiment, the one or more communication devices 1031-N are operable to read operational data (i.e., execute passive probing) during or after executing active probing.

The accuracy of the performance estimation algorithm may be dependent on the characteristics of the user's traffic patterns and the characteristics of the noise and channel environments. In an environment, noise and channel might vary frequently. In another environment, noise and channel might vary very infrequently. In yet another environment, noise and channel might vary frequently but mostly between two states only.

In one embodiment, the performance estimation algorithm 102 for each device is adaptively tuned. In one embodiment, the one or more communication devices 1031-N are operable to train the performance estimation algorithm 102 by updating the performance estimation algorithm 102 as a function of one or more criteria including at least one of: time of day, time of the week, type of communication device, manufacturer and model of equipment, equipment characteristics, firmware, backbone limitations, user's network usage pattern, radio-frequency (RF) characteristics including at least one of: signal power, frequency bands and mode of operation, environment statistics, or data on operation of communication devices adjacent to the communication device, wherein the data includes at least one of interference channels and levels.

In one embodiment, the one or more communication devices 1031-N are operable to compute throughput of the communication devices 1031-N using active probing data for training the performance estimation algorithm. In one embodiment, the one or more communication devices 1031-N are operable to transmit the active probing data and read operational data over the communication links 1071-N to the optimization center 101 (e.g., a server), where the operational data is related to user data traffic from the one or more communication devices 1031-N before, during and/or after executing active probing. In one embodiment, the optimization center 101 is operable to train the performance estimation algorithm 102 for the communication device according to active probing data and read operational data from the one or more communication devices 1031-N.

In one embodiment, the optimization center 101 is operable to apply machine learning algorithm for training the performance estimation algorithm for the communication device. In this embodiment, the accurate active probing data is used together with passive probing data for machine learning, and performance estimation algorithm 102, that uses only the passive data as input, is determined accordingly.

For example, the optimization center 101 (or any other communication device) may apply one or more of: decision tree learning, associated rule learning, artificial neural networks learning algorithm, genetic programming algorithm, inductive logic programming approach, support vector machine approach, clustering, Bayesian network based probabilistic graphical model, reinforcement learning, representation learning, sparse dictionary learning, etc. In other embodiments, other machine learning algorithms may be used. While the embodiments herein describe the machine learning algorithm applied by the optimization center 101, any communication device may have executable instructions and associated hardware to apply and perform machine learning for training performance estimation algorithm.

In one embodiment, after completing the training process for the performance estimation algorithm, the network 100 can be monitored with operational data (data from passive probing) without any interruption to user traffic. In one embodiment, active probing can be initiated by any communication device infrequently and/or dynamically depending on the need for accurate performance estimation and the need for training data for updating operational data estimator. For example, when the performance of the network falls below a threshold and the performance estimation does not provide accurate data, the communication device 1032 may invoke active probing to train the performance estimation algorithm so that the network 100 can be monitored via operational data in future.

Figure 2:
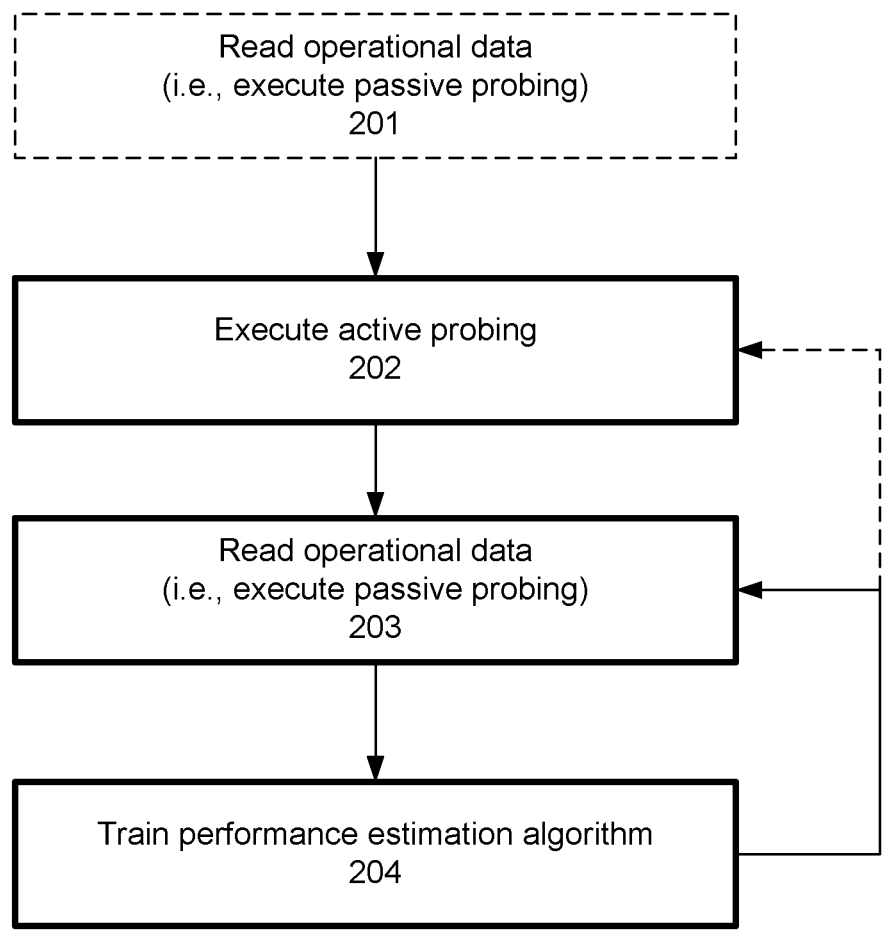
FIG. 2 is a flowchart for training the performance algorithm, according to one embodiment of the disclosure.

FIG. 2 is a flowchart 200 for training the performance algorithm, according to one embodiment of the disclosure. Although the blocks in the flowcharts with reference to FIG. 2 are shown in a particular order, the order of the actions can be modified. Thus, the illustrated embodiments can be performed in a different order, and some actions/blocks may be performed in parallel. The flowchart of FIG. 2 is illustrated with reference to the embodiments of FIG. 1. So as not to obscure the embodiment of this flowchart, details of each method step is not reiterated.

In one embodiment, the method comprises recording running values of counters related to data traffic on communication links, for example, links 1071-N, links between 105 and 1061-M, links between 1031 and 1061-M, and/or DSL links between 1032 and 104. In one embodiment, the running values of the counters include at least one of packet error counts, packet retransmission counts, successful ACK message counts, etc. For example, B1 is the total transmitted bytes recorded by the counters. In such an embodiment, the operational counters increase in count value for successfully delivered packets. In one embodiment, the communication device (e.g., 1031 or the optimization center 101) begins to execute active probing. In such an embodiment, active probing data is transmitted from the communication device (e.g., 1031, 105, 1032 or the optimization center 101) to another communication device (e.g., 101, 1061-M, or 104) via respective communication links (e.g., links 1071-N, links between 105 and 1061-M, and/or links between 1032 and 104).

In one embodiment, after waiting for 't' seconds (e.g., 0.001 seconds to 60 seconds) the operational counter values are read again, for example, a total of B2 transmitted bytes are now recorded from the operational counters. In one embodiment, throughput is calculated, where throughput= (B2−B1)/t in bytes/second. The calculated throughput may not be accurate due to any bias in the reported bytes from operational data compared to the actual user data bytes that were used. Another reason for inaccurate calculated throughput may be the reported bytes being much lower than the capacity of the link simply because user did not use the link heavily enough and did not generate enough traffic to cause the counters to increase their values with full speed. In one embodiment, such bias and inaccuracy in the calculated throughput may be detected by comparing the throughput calculated form operational data with throughput calculated with active probing data. In such an embodiment, the method discussed herein can be used to come up with a more accurate throughput estimation algorithm compared to the straightforward but inaccurate method of using (B2−B1)/t.

At block 201, the communication device (e.g., one or more of 1031-N, 105, and/or the optimization center 101)

reads operational data associated with the physical or Media Access Control (MAC) address layer (e.g., gateway) of the communication device. For example, the communication device 1032 reads operational data associated with the DSL link between the communication device 1032 and the CPE 104.

At block 202, the communication device executes active probing.

For example, test data is transmitted and received over links 1071-N, links between devices 105 and 1061-M, links between 1031 and 1061-M. In another example, test data is transmitted and received over DSL links between 1032 and 104. In other embodiments, test data from active probing is transmitted and received over other links and other communication devices.

At block 203, the communication device 1032 reads operational data again followed by executing active probing. In this embodiment, the counter values that correspond to the passive data or operational data are read again and now their content (counter values) represent a snapshot of network performance. The counter values may not provide an accurate snapshot of network performance using active probing data in the absence of a trained performance estimation algorithm for the link.

At block 204, the Optimization Center 101 uses the counter values (passive data i.e., operational data) along with active data determined by executing active probing to train the performance estimation algorithm 102. While the embodiments herein are explained using the Optimization Center 101 for training the performance estimation algorithm 102, any other communication device (of FIG. 1) in the network may be used for training the performance estimation algorithm 102. In one embodiment, the communication device 1032 can be using the data to train the performance algorithm 102.

In one embodiment, the Optimization Center 101 continues to refine the performance estimation algorithm 102 using the operational data because the operational data now has more relevant data after having executed active probing that normally generates full traffic (e.g., by flooding the links). In such an embodiment, execution of active probing can be limited so that data traffic is not interrupted. For example, the performance estimation algorithm 102 is updated using operational data which now provides an accurate estimation of the network performance.

Figure 3:
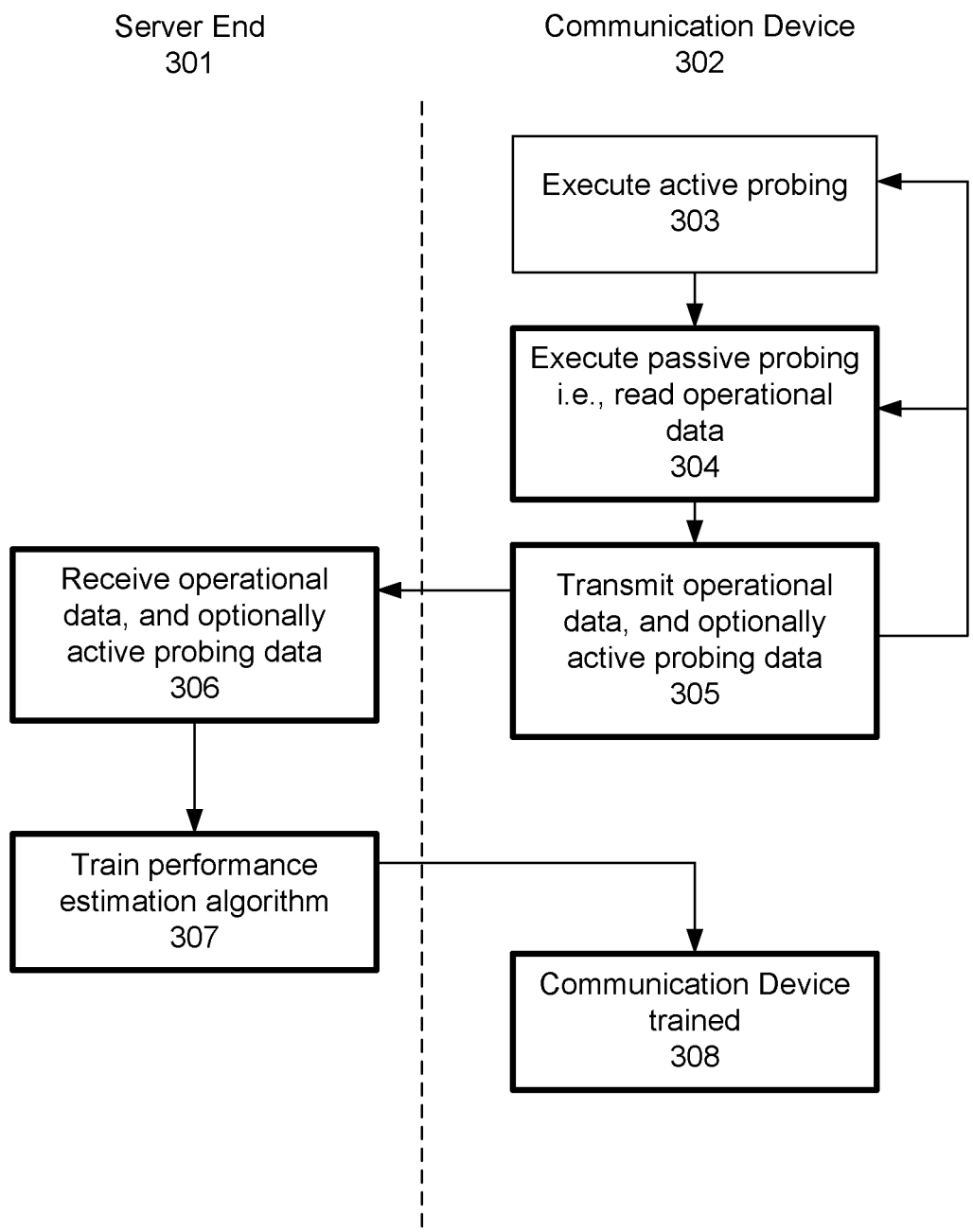
FIG. 3 is a flowchart for training the performance algorithm for a communication device by a server, according to one embodiment of the disclosure.

FIG. 3 is a flowchart 300 for training the performance algorithm for a communication device by a server, according to one embodiment of the disclosure. As mentioned before, any one of the communication devices 1031-N may be the server as well. Although the blocks in the flowcharts with reference to FIG. 3 are shown in a particular order, the order of the actions can be modified. Thus, the illustrated embodiments can be performed in a different order, and some actions/blocks may be performed in parallel. The flowchart of FIG. 3 is illustrated with reference to the embodiments of FIGS. 1-2.

The flowchart 300 is illustrated with reference to activities performed at the server end 301 and activities performed at the communication end 302. At block 303 the communication device 1032 executes active probing. For example, the communication device 1032 sends test data over the communication link 1072 to the server 101 and then receives the active data from the server 101. In another example, the communication device 1032 sends test data over the DSL link to the CPE 104, which behaves like a server, and then receives active data from the CPE 104. In the embodiments discussed herein, any of the communication device may behave as a server to process data (active and/or passive) for updating the performance estimation algorithm.

At block 304, the communication device 1032 executes passive probing i.e., reads operational data. At block 305, the communication device 1032 transmits operational data to the sever end 301. For example, the communication device 1032 transmits operational data over the communication link 1072 to the server 101. In another example, the communication device 1032 transmits operational data over the DSL link to the CPE 104 which behaves like a server.

At block 306, operational data is received by at the server end 301. For example, operational data is received by the server 101. In another example, operational data is received over the DSL link to the CPE 104 which behaves as a server.

At block 307, the communication device at the server end 301 trains the performance estimation algorithm 102 according to data received from active probing and/or operational data (passive probing data). At block 308, the trained algorithm is sent to the communication device 1032 which may use that training algorithm to gauge the performance of the communication device 1032.

As discussed herein, performance estimation using operational data is not intrusive as opposed to using traditional network monitoring utilities (NMUs) with active probing. Operational data are generally readily available and can be used for continuous updating or training of the performance estimation algorithm and for evaluating network performance. In one embodiment, accurate NMUs are used intermittently (e.g., once a week) to calibrate, enhance, or fine-tune operational data based performance estimation methods. In such an embodiment, operational data is used to continuously monitor the network while NMUs are used intermittently to calibrate the performance estimation methods. The results obtained from the NMUs and the operational data can be combined together using a learning-based algorithm. For example, throughput estimates of the network obtained using operational data can be calibrated by active probing of the network using NMU based techniques.

In the situation where each communication link, for example, links 1071-N, links between 105 and 1061-M, links between 1031 and 1061-M, and/or DSL links between 1032 and 104 are unique, results from the NMUs and the operational data can be used in link-tailored algorithms.

For example, a particular link e.g., links 1071-N, links between 105 and 1061-M, links between 1031 and 1061-M, and/or DSL link between 1032 and 104, may have very high data traffic which does not allow for frequent calibrations using NMUs because executing NMUs interfere with user traffic. In such an embodiment, the learning algorithm may combine the occasional result from the NMU and the more frequent results from the operational data (passive data from passive probing) to tune the performance estimation algorithm to suite the particular links' operational data characteristics. In some embodiments, relevant operational data fields may be unavailable but their absence is accommodated by the occasional per-link calibration using NMU measurement to overcome any limitation from the unavailability of relevant operational data fields.

In one example, patterns in the transmission and reception characteristics may be identified using operational data (i.e., passive probing data) and confirmed (or calibrated) using NMUs (i.e., active probing). In one embodiment, such patterns in the transmission and reception characteristics may be based on time, traffic, channel, application, etc. These patterns can also be used for performance estimation.

In another example, performance estimation or performance evaluation of a network may be performed in real-time using real-time data by a user of the communication device 1032. For example, a user wants to perform self-diagnosis of the communication device 1032 may initiate performance estimation which executes active probing and reads operational data. In another example, a service provider may monitor performance of a network and diagnose a communication link in the network in response to a help request from a customer.

Figure 4:
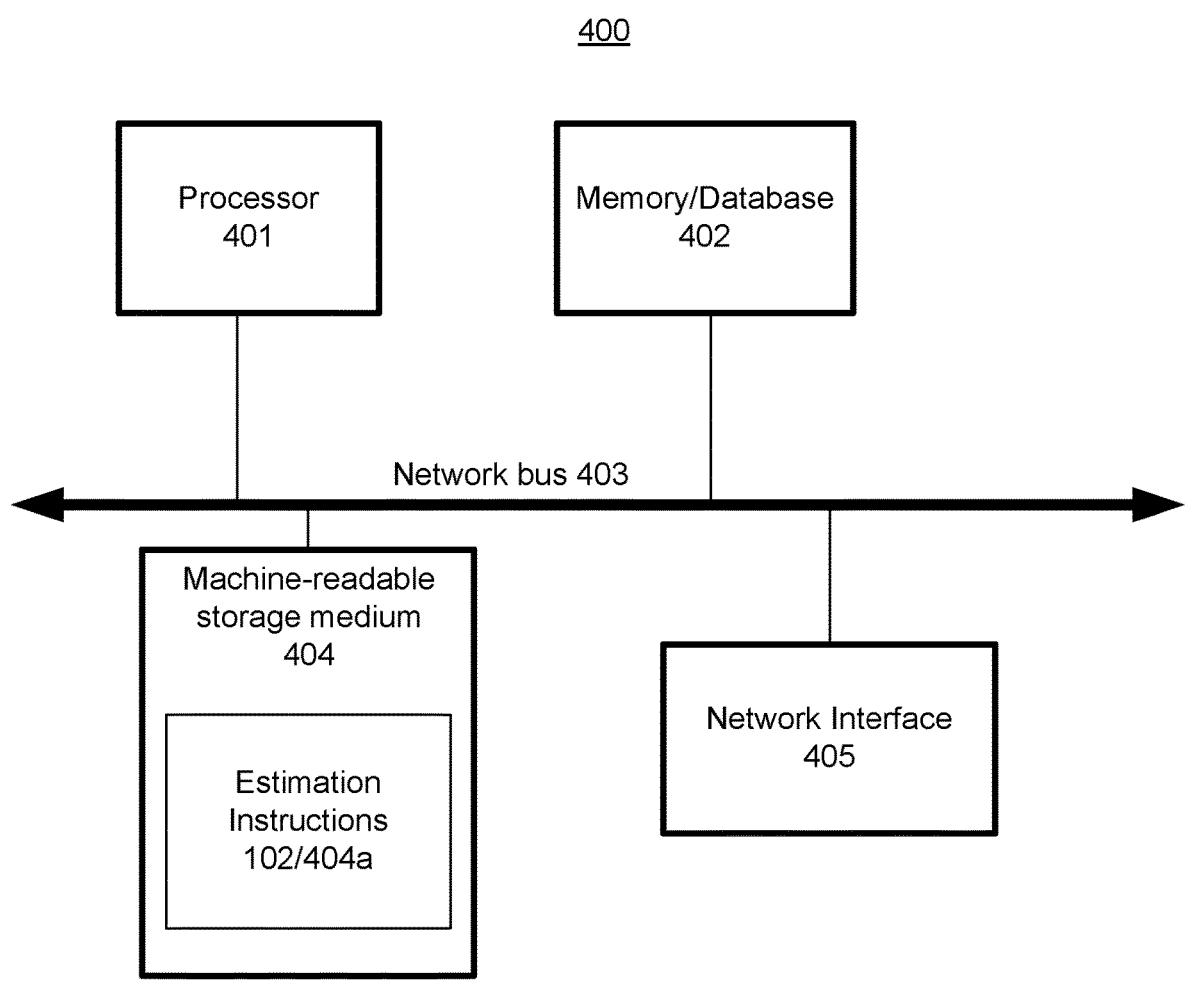
FIG. 4 is a processor-based system having machine-readable storage medium with computer executable instructions operable to estimate and improve communication system performance algorithm, according to one embodiment of the disclosure.

FIG. 4 is a processor-based system 400 having machine-readable storage medium 404 with computer executable instructions 102/404a operable to estimate and improve communication system performance algorithm, according to one embodiment of the disclosure. The storage medium and associated computer executable instructions may be in any of the communication devices and/or servers discussed herein. The computer-machine-readable/executable instructions 102/404a are executed by a processor 401. Elements of embodiments are provided as machine-readable medium for storing the computer-executable instructions (e.g., instructions to implement the flowcharts of FIGS. 2-3 and other processes discussed in the description).

In one embodiment, the processor-based system 400 further comprises a database 402 to store data used by the instructions 102/404a. In one embodiment, the processor-based system 400 includes a network interface 405 to communicate with other devices. In one embodiment, the components of the processor-based system 400 communicate with one another via a network bus 403.

The machine-readable storage medium 404 may include, but is not limited to, flash memory, optical disks, hard disk drive (HDD), Solid State Drive (SSD), CD-Read Only Memory (CD-ROMs), DVD ROMs, RAMs, EPROMs, EEPROMs, magnetic or optical cards, or other type of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

The following examples pertain to further embodiments. Specifics in the examples may be used anywhere in one or more embodiments. All optional features of the apparatus described herein may also be implemented with respect to a method or process.

For example, in one embodiment a method for performance estimation of a communication device, the method comprises: executing active probing to determine active probing data; reading operational data which includes data related to channel and its noise condition and counter values related to user data traffic between the communication device and another communication device, wherein the operational data is relevant to the current settings of the communication device; and training a performance estimation algorithm for the communication device according to the active probing data and the operational data.

In one embodiment, the method further comprises: prior to executing active probing, reading operational data. In one embodiment, reading operational data is performed during or after executing active probing. In one embodiment, training the performance estimation algorithm comprises: updating the performance estimation algorithm as a function of one or more criteria including at least one of: time of day, time of the week, type of communication device, manufacturer and model of equipment, equipment characteristics, firmware, backbone limitations, user's network usage pattern, RF characteristics including at least one of: signal power, path loss, noise level, frequency bands and mode of operation, environment statistics, or data on operation of communication devices adjacent to the communication device, wherein the data includes at least one of interference channels and levels.

In one embodiment, executing active probing comprises: transmitting active probing data from the communication device to the other communication device; and waiting for a predetermined time before reading the operational data. In one embodiment, executing active probing comprises: transmitting active probing data from the communication device to the other communication device; and receiving a report indicating amount of data or data received by the other communication device. In one embodiment, executing active probing comprises: transmitting traffic from the communication device to the other communication device; and recording measured data associated with the transmitted traffic.

In one embodiment, the method further comprises: computing at least one of throughput of the communication device, connectivity, latency, jitter, or error rate using active probing data for training the performance estimation algorithm. In one embodiment, executing active probing is performed fewer times than executing passive probing.

In one embodiment, the method further comprises: transmitting the active probing data and read operational data to a server, before, during and/or after executing active probing. In one embodiment, the server to train the performance estimation algorithm for the communication device according to active probing data and read operational data from the communication device and other communication devices. In one embodiment, the server to apply a machine learning algorithm for training the performance estimation algorithm for the communication device.

In one embodiment, the communication device comprises at least one of: an access point (AP); a base station; a wireless local area network (LAN) device; a digital subscriber line access multiplexer (DSLAM); a gateway; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In another example, in one embodiment there is a machine-readable storage medium for storing machine-executable instructions that when executed cause a processor to perform a method according to the method discussed herein.

In another example, a system comprises: an optimization center communicatively coupled to one or more communication devices, wherein the one or more communication devices are operable to: execute active probing to determine active probing data; read operational data which includes data related to channel and its noise condition and counter values related to user data traffic between the communication device and another communication device, wherein the operational data is relevant to the current settings of the communication device; and train a performance estimation algorithm for the communication device according to the active probing data and the operational data.

In one embodiment, the optimization center is implemented as a server or as a communication device from among the one or more communication devices. In one embodiment, the one or more communication devices are operable to, prior to executing active probing, read operational data. In one embodiment, the one or more communication devices are operable to read operational data during or after executing active probing.

In one embodiment, the one or more communication devices are operable to train the performance estimation algorithm by updating the performance estimation algorithm as a function of one or more criteria including at least one of: time of day, time of the week, type of communication device, manufacturer and model of equipment, equipment characteristics, firmware, backbone limitations, user's network usage pattern, RF characteristics including at least one of: signal power, path loss, noise level, frequency bands and mode of operation, environment statistics, or data on operation of communication devices adjacent to the communication device, wherein the data includes at least one of interference channels and levels.

In one embodiment, the one or more communication devices are operable to execute active probing by: transmitting active probing data from the communication device to the other communication device; and waiting for a predetermined time before reading the operational data. In one embodiment, the one or more communication devices are operable to execute active probing by: transmitting active probing data from the communication device to the other communication device; and receiving a report indicating amount of data or data received by the other communication device. In one embodiment, the one or more communication devices are operable to execute active probing by: transmitting traffic from the communication device to the other communication device; and recording measured data associated with the transmitted traffic.

In one embodiment, the one or more communication devices are operable to compute at least one of throughput of the communication device, connectivity, latency, jitter, or error rate using active probing data for training the performance estimation algorithm. In one embodiment, the one or more communication devices are operable to execute active probing fewer times than to execute passive probing.

In one embodiment, the one or more communication devices are operable to: transmit the active probing data and read operational data to a server, before, during and/or after executing active probing. In one embodiment, the server is operable to train the performance estimation algorithm for the communication device according to active probing data and read operational data from the communication device and other communication devices. In one embodiment, the server is operable to apply a machine learning algorithm for training the performance estimation algorithm for the communication device.

In one embodiment, the communication device comprises at least one of: an access point (AP); a base station; a wireless local area network (LAN) device; a digital subscriber line access multiplexer (DSLAM); a gateway; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In another example, in one embodiment a method for performance estimation of a communication device, the method comprises: receiving operational data including counter values from the communication device after executing active probing and passive probing, the counter values related to user data traffic from the communication device to another communication device; and training a performance estimation algorithm for the communication device according to the operational data before or after executing active probing.

In one embodiment, the method further comprises: prior to executing active probing, receiving operational data. In one embodiment, the operational data is received during or after executing active probing.

In one embodiment, training the performance estimation algorithm comprises: updating the performance estimation algorithm as a function of one or more criteria including at least one of: time of day, time of the week, type of communication device, manufacturer and model of equipment, equipment characteristics, firmware, backbone limitations, user's network usage pattern, RF characteristics including at least one of: signal power, path loss, noise level, frequency bands and mode of operation, environment statistics, or data on operation of communication devices adjacent to the communication device, wherein the data includes at least one of interference channels and levels.

In one embodiment, executing active probing comprises: transmitting active probing data from the communication device to the other communication device; and waiting for a predetermined time before reading the operational data. In one embodiment, executing active probing comprises: transmitting active probing data from the communication device to the other communication device; and receiving a report indicating amount of data or data received by the other communication device.

In one embodiment, the method further comprises: computing at least one of throughput of the communication device, connectivity, latency, jitter, or error rate using active probing data for training the performance estimation algorithm. In one embodiment, executing active probing is performed fewer times than executing passive probing.

In one embodiment, the method further comprises: receiving the active probing data and read operational data, the operational data related to user data traffic from the communication device before, during and/or after executing active probing. In one embodiment, training the performance estimation algorithm for the communication device is performed according to active probing data and read operational data from the communication device and other communication devices. In one embodiment, training the performance estimation algorithm comprises applying a machine learning algorithm.

In one embodiment, the communication device comprises at least one of: an access point (AP); a base station; a wireless local area network (LAN) device; a digital subscriber line access multiplexer (DSLAM); a gateway; a performance enhancement device; a Digital Subscriber Line (DSL) Customer Premises Equipment (CPE) modem; an in-home powerline device; a Home Phoneline Network Alliance (HPNA) based device; an in-home coax distribution device; a G.hn (Global Home Networking Standard) compatible device; an in-home metering communication device; an in-home appliance communicatively interfaced with the LAN; a wireless femtocell base station; a wireless WiFi compatible base station; a wireless mobile device repeater; a wireless mobile device base station; nodes within an ad-hoc/mesh network; a set-top box (STB)/set-top unit (STU) customer electronics device; an Internet Protocol (IP) enabled television; an IP enabled media player; an IP enabled gaming console; an Ethernet gateway; a computing device connected to the LAN; an Ethernet connected computer peripheral device; an Ethernet connected router; an Ethernet connected wireless bridge; an Ethernet connected network bridge; and an Ethernet connected network switch.

In yet another example, there is a machine-readable storage medium for storing machine-executable instructions that when executed cause a processor to perform the method discussed herein.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

The invention claimed is:

1. A method for managing a plurality of wireless channels across a plurality of devices within a multi-cell environment, the method comprising:
   receiving first active probing data at a base station from a first device within the plurality of devices, the first active probing data corresponding to a first wireless channel within a first cell operating in accordance with a first wireless standard;
   receiving second active probing data at the base station from the first device, the second active probing data corresponding to a second wireless channel within a second cell operating in accordance with a second wireless standard, the second wireless standard being different than the first wireless standard;
   assessing, by the base station, the first active probing data for performance estimation corresponding to the first wireless channel within the first cell, and assessing the second active probing data for performance estimation corresponding to the second wireless channel within the second cell; and
   selecting, by the base station, the first wireless channel based on a comparison of the performance estimation corresponding to the first wireless channel and the performance estimation corresponding to the second wireless channel,
   wherein after the performance estimation performed by active probing, monitoring at least one performance estimation characteristic of the first wireless channel using passive probing.

2. The method of claim 1, further comprising the step of optimizing connectivity to the first device by transitioning to the second wireless channel to communicate with the first device if the at least one performance estimation characteristic of the first wireless channel falls below a performance threshold.

3. The method of claim 1, wherein the passive probing comprises counting, while communicating on the first wireless channel, one or more of:
   ACK messages received from the first device,
   successful transmit packets,
   successful receive packets,
   error packets,
   discarded packets, and
   retransmissions.

4. The method of claim 1, further comprising the step of adjusting a power level of communication within the first wireless channel based at least partially on the passive probing.

5. The method of claim 1, further comprising:
   receiving third active probing data at the base station from the first device, the third active probing data corresponding to a third wireless channel within the first cell operating in accordance with a third wireless standard, the third wireless standard being different than the first wireless standard;
   assessing, by the base station, the first active probing data for performance estimation corresponding to the first wireless channel within the first cell, and assessing the third active probing data for performance estimation corresponding to the third wireless channel within the first cell; and
   selecting, by the base station, the first wireless channel based on a comparison of the performance estimation corresponding to the first wireless channel and the performance estimation corresponding to the third wireless channel.

6. The method of claim 1, wherein training a performance estimation processor comprises:
   updating the performance estimation processor as a function of one or more criteria which includes at least one of:

time of day,
time of week,
type of communication device,
manufacturer and model of equipment,
equipment characteristics,
firmware,
backbone limitations,
user's network usage pattern,
RF characteristics including at least one of: signal power, path loss, noise level, frequency bands or mode of operation,
environment statistics, or
data on operation of communication devices adjacent to the communication device, wherein the data includes at least one of interference channels and levels.

7. The method of claim 1, further comprises:
computing, by the base station, at least one of: throughput of the plurality of devices, connectivity, latency, jitter, or error rate using the active probing data for training a performance estimation processor.

8. The method of claim 1, wherein training a performance estimation processor comprises applying a machine learning algorithm.

9. The method of claim 1, wherein each of the plurality of devices comprise at least one of:
an access point (AP);
a base station;
a wireless local area network (LAN) device;
a gateway;
a performance enhancement device;
a Digital Subscriber Line (DSL) Customer Premises Equipment (CPE) modem;
an in-home powerline device;
a Home Phoneline Network Alliance (HPNA) based device;
an in-home coax distribution device;
a G.hn (Global Home Networking Standard) compatible device;
an in-home metering communication device;
an in-home appliance communicatively interfaced with the LAN;
a wireless femtocell base station;
a wireless WiFi compatible base station;
a wireless mobile device repeater;
a wireless mobile device base station;
nodes within an ad-hoc/mesh network;
a set-top box (STB)/set-top unit (STU) customer electronics device;
an Internet Protocol (IP) enabled television;
an IP enabled media player;
an IP enabled gaming console;
an Ethernet gateway;
a computing device connected to the LAN;
an Ethernet connected computer peripheral device;
an Ethernet connected router;
an Ethernet connected wireless bridge;
an Ethernet connected network bridge; or
an Ethernet connected network switch.

10. The method of claim 1, wherein the active probing comprises sending low-rate test packets.

11. The method of claim 1, wherein the active probing comprises sending one or more test streams.

12. The method of claim 1, further comprising estimating throughput based on packet error counts.

13. A method for managing a plurality of wireless channels across a plurality of devices within a single cell environment, the method comprising:
receiving first active probing data at a base station from a first device within the plurality of devices, the first active probing data corresponding to a first wireless channel within the single cell operating in accordance with a first wireless standard;
receiving second active probing data at the base station from the first device, the second active probing data corresponding to a second wireless channel within the single cell operating in accordance with a second wireless standard, the second wireless standard being different than the first wireless standard;
assessing, by the base station, the first active probing data for performance estimation corresponding to the first wireless channel within the single cell, and assessing the second active probing data for performance estimation corresponding to the second wireless channel within the single cell; and
selecting, by the base station, the first wireless standard based on a comparison of the performance estimation corresponding to the first wireless standard operating on the first wireless channel and the performance estimation corresponding to a second wireless standard operating on the second wireless channel,
wherein after the performance estimation performed by active probing, monitoring at least one performance estimation characteristic of the first wireless standard operating on the first wireless channel using passive probing.

14. The method of claim 13, further comprising the step of optimizing connectivity to the first device by transitioning to the second wireless channel to communicate with the first device if the at least one performance estimation characteristic of the first wireless channel falls below a performance threshold.

15. The method of claim 13, wherein the passive probing comprises counting, while communicating on the first wireless channel, one or more of:
ACK messages received from the first device,
successful transmit packets,
successful receive packets,
error packets,
discarded packets, and
retransmissions.

16. The method of claim 13, further comprising the step of adjusting a power level of communication within the first wireless channel based at least partially on the passive probing.

17. A non-transitory computer readable storage medium having computer program code stored thereon, the computer program code, when executed by one or more processors implemented on a computing platform that is located at a base station, causes the computing platform to perform a method comprising:
receiving first active probing data at the computing platform from a first device within a plurality of devices, the first active probing data corresponding to a first wireless channel within a first cell operating in accordance with a first wireless standard;
receiving second active probing data at the computing platform from the first device, the second active probing data corresponding to a second wireless channel within a second cell operating in accordance with a second wireless standard, the second wireless standard being different than the first wireless standard;
assessing, by the computing platform, the first active probing data for performance estimation corresponding to the first wireless channel within the first cell, and assessing the second active probing data for performance estimation corresponding to the second wireless channel within the second cell; and selecting, by the computing platform, the first wireless channel based on a comparison of the performance estimation corresponding to the first wireless channel and the performance estimation corresponding to the second wireless channel.

18. The method of claim 17, wherein after the performance estimation performed by active probing, monitoring at least one performance estimation characteristic of the first wireless channel using passive probing.

19. The method of claim 17, further comprising:

receiving third active probing data by the computing platform from the first device, the third active probing data corresponding to a third wireless channel within the first cell operating in accordance with a third wireless standard, the third wireless standard being different than the first wireless standard;

assessing, by the computing platform, the first active probing data for performance estimation corresponding to the first wireless channel within the first cell, and assessing the third active probing data for performance estimation corresponding to the third wireless channel within the first cell; and selecting, by the computing platform, the first wireless channel based on a comparison of the performance estimation corresponding to the first wireless channel and the performance estimation corresponding to the third wireless channel.

* * * * *